(12) United States Patent
Sam et al.

(10) Patent No.: US 9,800,049 B1
(45) Date of Patent: Oct. 24, 2017

(54) METHOD AND APPARATUS FOR CORRECTING FOR POWER HARMONICS

(71) Applicant: B/E AEROSPACE, INC., Wellington, FL (US)

(72) Inventors: Luis Sam, South Setauket, NY (US); Eric Johannessen, Holbrook, NY (US); Brendan Upton, East Patchogue, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/404,615

(22) Filed: Jan. 12, 2017

(51) Int. Cl.
*H02J 3/01* (2006.01)
*H05B 33/08* (2006.01)

(52) U.S. Cl.
CPC .............. *H02J 3/01* (2013.01); *H05B 33/083* (2013.01); *H05B 33/0812* (2013.01); *H05B 33/0845* (2013.01)

(58) Field of Classification Search
USPC ..... 315/247, 224, 225, 291, 307–326, 185 S
See application file for complete search history.

(56) References Cited

U.S. PATENT DOCUMENTS

| | | | | |
|---|---|---|---|---|
| 5,025,204 A | * | 6/1991 | Su | G05F 3/22 323/273 |
| 2013/0093339 A1 | * | 4/2013 | Chen | H05B 33/0812 315/192 |
| 2015/0123568 A1 | * | 5/2015 | Yang | H05B 33/0812 315/297 |
| 2016/0205742 A1 | * | 7/2016 | Seki | H05B 33/0827 315/122 |

* cited by examiner

*Primary Examiner* — Tuyet Vo
(74) *Attorney, Agent, or Firm* — Drinker Biddle & Reath LLP

(57) ABSTRACT

A harmonics correction circuit is implemented as an independent device (such as a SiP or ASIC), and includes (1) a first node, (2) a second node, (3) a first current path extending from the first node to the second node, (4) a second current extending from the first node to ground, (5) a third current path extending from the first node to the second node, (6) a sense resistor electrically connected to the second node and to ground, (7) a differential circuit (e.g., a differential amplifier or other type of operational amplifier ("op-amp")) that has a first input, a second input, and an output, (8) a transistor comprising a gate that is electrically connected to the output of the differential circuit, a drain that is electrically connected to the third current path, and a source that is electrically connected along the third current path.

11 Claims, 16 Drawing Sheets

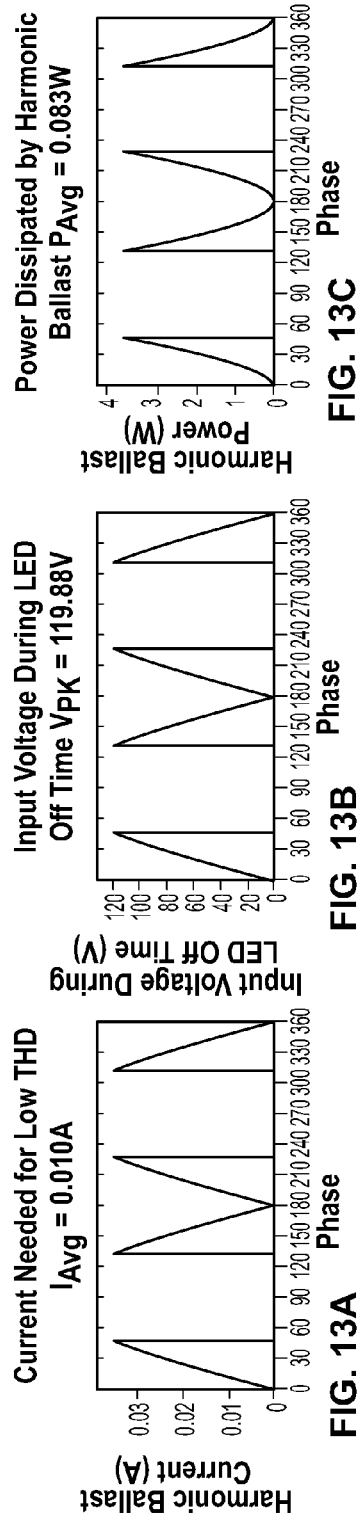
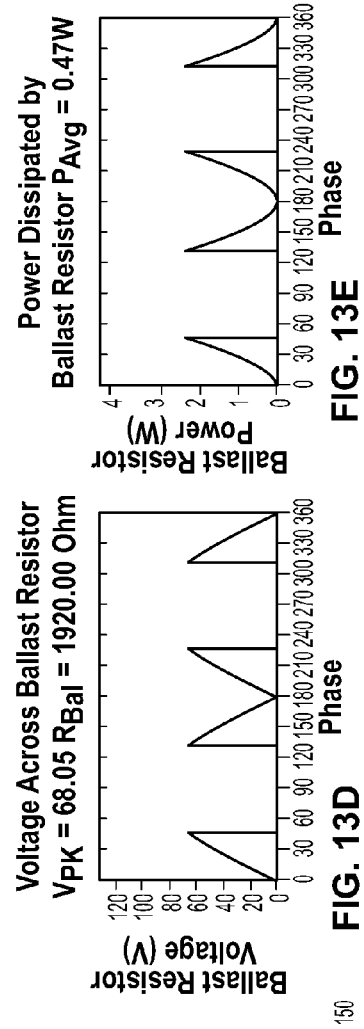
FIG. 13A Current Needed for Low THD $I_{Avg}$ = 0.010A
FIG. 13B Input Voltage During LED Off Time $V_{PK}$ = 119.88V
FIG. 13C Power Dissipated by Harmonic Ballast $P_{Avg}$ = 0.083W
FIG. 13D Voltage Across Ballast Resistor $V_{PK}$ = 68.05 $R_{Bal}$ = 1920.00 Ohm
FIG. 13E Power Dissipated by Ballast Resistor $P_{Avg}$ = 0.47W
FIG. 13F Voltage Across Ballast Transistor $V_{PK}$ = 51.83V
FIG. 13G Power Dissipated by Ballast Transistor $P_{Avg}$ = 0.36W

METHOD AND APPARATUS FOR CORRECTING FOR POWER HARMONICS

TECHNICAL FIELD

The present disclosure relates generally to correction of electrical signals for characteristics such as harmonics and power factor.

BACKGROUND

There are many scenarios in which power harmonics can have a significant impact on an electrical system. One such scenario is on aircraft electrical systems. In an aircraft, particularly a passenger aircraft, unwanted harmonics in one system can have a negative impact on other systems and can also generate adverse electromagnetic field effects.

DRAWINGS

While the appended claims set forth the features of the present techniques with particularity, these techniques, together with their objects and advantages, may be best understood from the following detailed description taken in conjunction with the accompanying drawings of which:

FIG. 13A depicts a waveform of a current level that results in low total harmonic distortion ("THD") according to an embodiment.

FIG. 13B depicts a waveform of the input voltage during the period of time when the LED lights of the LED light string are off, according to an embodiment.

FIG. 13C depicts a waveform of the power dissipated by the harmonic ballast according to an embodiment.

FIG. 13D depicts a waveform of the voltage across the ballast resistor(s) according to an embodiment.

FIG. 13E depicts a waveform of the power dissipated by the ballast resistor(s) according to an embodiment.

FIG. 13F depicts a waveform of the voltage across a transistor that controls the amount of current drawn by the ballast resistors(s) ("ballast transistor") according to an embodiment.

FIG. 13G depicts a waveform of the power dissipated by the ballast transistor according to an embodiment.

DESCRIPTION

Figure 1:
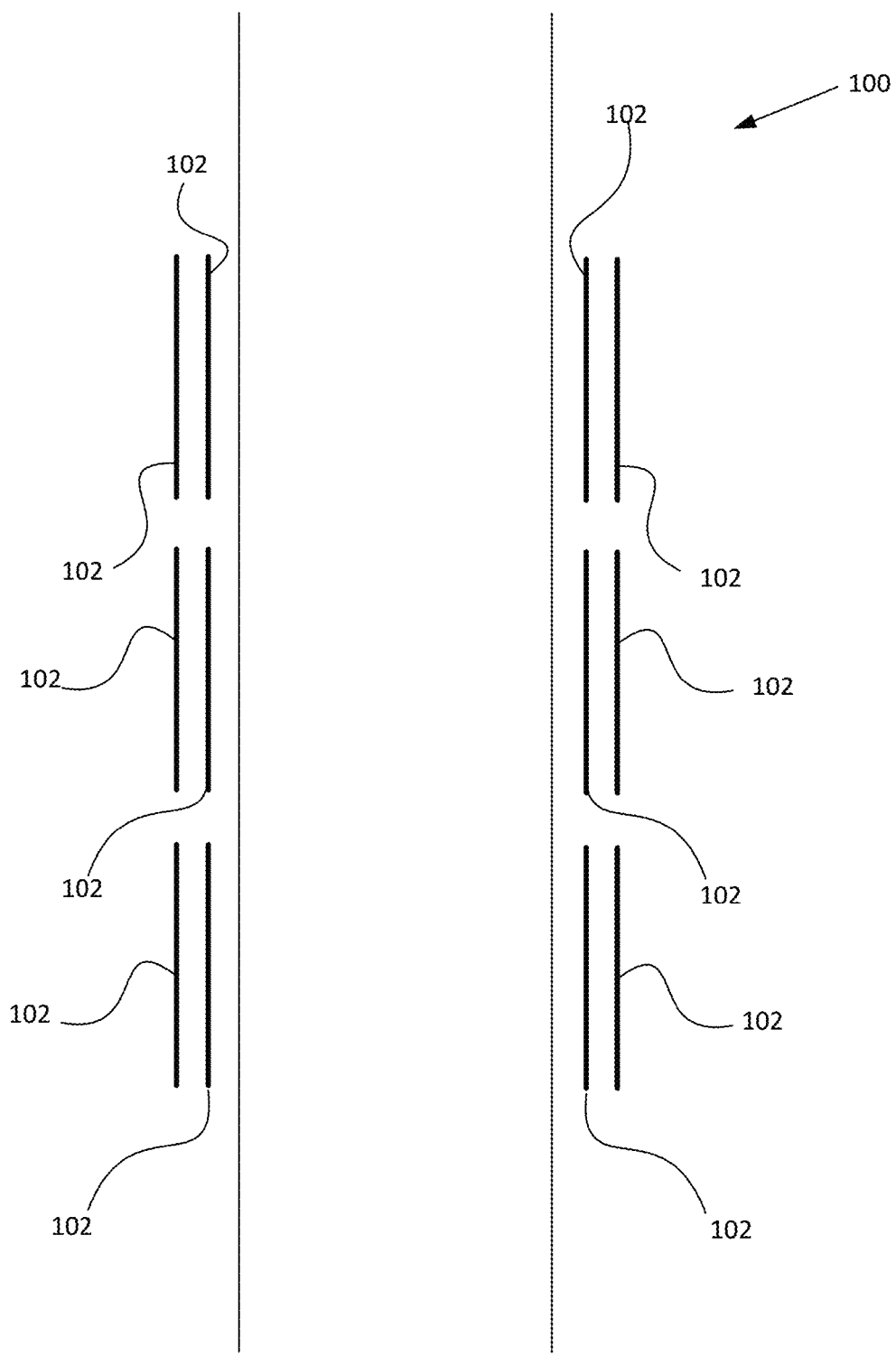
FIG. 1 is a block diagram of an aircraft lighting system in which various embodiments of the disclosure may be used.

The present disclosure is generally directed to a method and apparatus for correcting for power harmonics. In an embodiment, the method and apparatus are implemented as a discrete hardware device (e.g., a replaceable module, a SiP, or an ASIC), which may itself be incorporated into other devices (such as an LED lighting unit).

According to an embodiment, to correct for harmonic distortion and power factor, a harmonic and power factor correction circuit ("correction circuit") detects shape of an input waveform, detects the shape of the waveform at the output of a set of LED lights (e.g., an LED string), and draws a varying amount of current (more current or less current, depending on what is needed) to align the two waveforms in terms of shape and phase. To detect the shapes of the two waveforms in an embodiment, the correction circuit includes a differential circuit (such as a differential amplifier) that receives the two waveforms as inputs. The input waveform originates from a power source that is also providing current to the LED string. In an embodiment, the waveform at the output of the LED string is reflected as a voltage at a sense resistor, which is electrically coupled to a node through which the current as measured at the output of the group of LEDs passes.

In an embodiment, a harmonics correction circuit is implemented as an independent device (such as a SiP or ASIC), and includes (1) a first node, (2) a second node, (3) a first current path extending from the first node to the second node, (4) a second current extending from the first node to ground, (5) a third current path extending from the first node to the second node, (6) a sense resistor electrically connected to the second node and to ground (such that the voltage across the sense resistor has a waveform whose shape and phase represent the shape and phase of the waveform of a current on the first current path), (7) a differential circuit (e.g., a differential amplifier or other type of operational amplifier ("op-amp")) that has a first input, a second input, and an output, (8) a transistor comprising a gate that is electrically connected to the output of the differential circuit, a drain that is electrically connected to the third current path, and a source that is electrically connected along the third current path.

According to an embodiment, the first input of the differential circuit (e.g., the positive input) is electrically connected to the second current path and the second input of the differential circuit (e.g., the negative input) is electrically connected to the sense resistor. Thus, the second input receives feedback from the second node, so that when the current waveform changes of the sense resistor changes, the change is reflected as a voltage change at the second input of the differential circuit. The differential circuit drives the transistor so as to equalize the voltage at the first and second inputs, resulting in a current waveform whose phase and shape are matched to that of the voltage waveform.

In an embodiment, a power harmonics correction circuit is employed in a larger circuit that includes an LED light string, in which the larger circuit includes a potentiometer (e.g., a digital potentiometer) or variable resistor that is electrically connected to the first input of the differential circuit and acts as a voltage divider. By adjusting the resistance of the potentiometer or variable resistor, the input voltage at the first input can be scaled, thereby acting to control brightness of the LED lights on the LED light string.

According to an embodiment, a power harmonics correction circuit is employed in a larger circuit that includes an LED light string having multiple banks of LED lights (e.g., a first bank and a second bank). The correction circuit includes a first transistor, which is electrically connected between the first bank and ground, and a second transistor, which is electrically connected between the second bank and ground. The gate of the first transistor is electrically connected to the output of an op-amp such that the input voltage at the gate of the first transistor rises and falls with the output voltage. The gate of the second transistor is electrically connected to the output of the op-amp such that the input voltage at the gate of the second transistor rises and falls with the output voltage. The correction circuit is configured such that the input voltage at the gate of the first transistor is higher than the input voltage at the gate of the second transistor (e.g., as a result of a resistive element being located along the conductive path between the output and the gate of the second transistor). When the voltage across the LED light string below a level sufficient for the all of the LEDs in the string to operate, the voltage across the sense resistor drops, thereby causing the differential circuit to increase its output until the input voltage at the gate of the second transistor increases sufficiently to allow current to flow across the second transistor. As a result, the second bank of LED lights operates even when the first bank cannot. This allows the LED light string to be smoothly dimmed. Additionally, it allows the current conduction to be constant and in phase with the input AC voltage regardless of whether there is enough voltage for the LEDs to illuminate. As a result, the current can be a mirror image of the voltage, which keeps power factor at 1 and the total harmonic distortion as low as possible.

In an embodiment, the correction circuit includes a voltage divider (e.g., a pair of resistors having a node therebetween to which positive input of the op-amp is connected) to reduce the input waveform to a voltage suitable for the differential circuit. In embodiment, the correction circuit further includes a ballast resistance (e.g., a ballast resistor) in the feedback path to provide an upper limit on the amount of current that passes through the transistor.

To correct for harmonic distortion and power factor in an embodiment, the correction circuit provides an output current of the differential circuit to a transistor that is disposed in a feedback path to the differential circuit. As the output current of the differential circuit varies, the resistance of the transistor varies, thereby helping to keep the two waveforms aligned. In an embodiment, the differential circuit acts to adjust the resistance of the transistor so that at the voltage level at which the LED lights turn on, the current through the ballast resistance matches the current being drawn through the LED lights.

Turning to FIG. 1, a lighting system 100 in which an embodiment of the disclosure may be employed is shown. The system 100 is depicted as being deployed in a passenger cabin of an aircraft. The system 100 includes multiple lighting elements 102, each of which may be implemented as an LRU.

Figure 2:
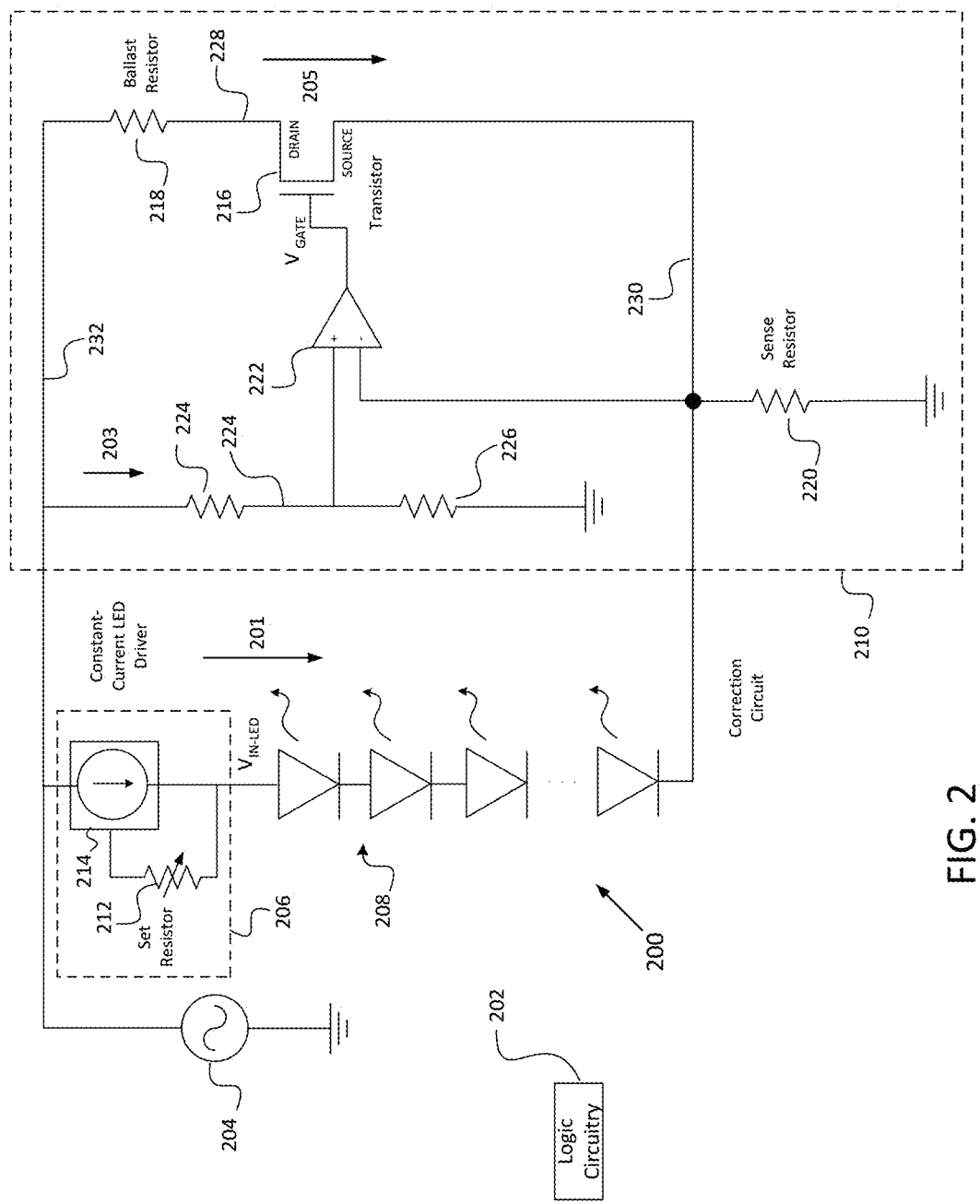
FIG. 2 is circuit diagram illustrating one possible embodiment.

Turning to FIG. 2, the harmonics correction method and apparatus of the present disclosure is depicted as being employed in a lighting circuit 200. The method and apparatus may be employed in non-lighting devices as well, and the lighting examples described herein are meant only to be illustrative. The lighting circuit 200 is controlled by logic circuitry 202. The lighting circuit 200 includes an alternating current ("AC") power source 204, a constant-current LED driver ("driver") 206, LED lights 208 (shown as being coupled in series), and a harmonic correction circuit ("circuit") 210. The logic circuitry 202 (e.g., microprocessor, microcontroller, ASIC), or field-programmable gate array ("FPGA") controls the driver 206 to provide electrical power to the LED lights 208 at one or more frequencies and/or pulse widths in order to produce a particular lighting effect. In some embodiments, the logic circuitry 202 is located within an LRU along with the lighting circuit 200. The circuit 210, as will be described below in further detail, shapes the waveform of the signal within the lighting circuit 200 so that the voltage and current waveforms closely or exactly match.

The driver 206 includes an LED driver 214 (e.g., a constant current generator suitable to drive LEDs) and a set resistor 212. The logic circuitry 202 adjusts the set resistor 212 to control the output colors and intensity of the LED lights 208.

In an embodiment, the logic circuitry 202 controls the LED driver 214 output to the LED lights 208 according to the following:

The circuit 210 includes a transistor 216, a ballast resistor 218, a sense resistor 220, a differential amplifier ("amplifier") 222, a first divider resistor 224, and a second divider resistor 226. The transistor 216 is depicted as a metal-oxide-semiconductor field-effect transistor ("MOSFET"), but may be implemented in other ways (e.g., a bipolar junction transistor). The circuit 210 has a first node 232 and a second node 230. The circuit 210 includes a first current path 201 extending from the first node 232 to the second 230, a second current path 203 extending from the first node 232 to ground, and a third current path 205 extending from the first node 232 to the second node 230.

The gate of the transistor 216 is electrically coupled to the output of the amplifier 222, the drain of the transistor 216 is electrically coupled to a third node 228, and the source of the transistor 216 is electrically coupled to the second node 230.

The ballast resistor 218 is electrically coupled to the third node 228 and to the first node 232.

The harmonic sense resistor 220 is electrically coupled to the second node 230 and to ground.

Figure 3:
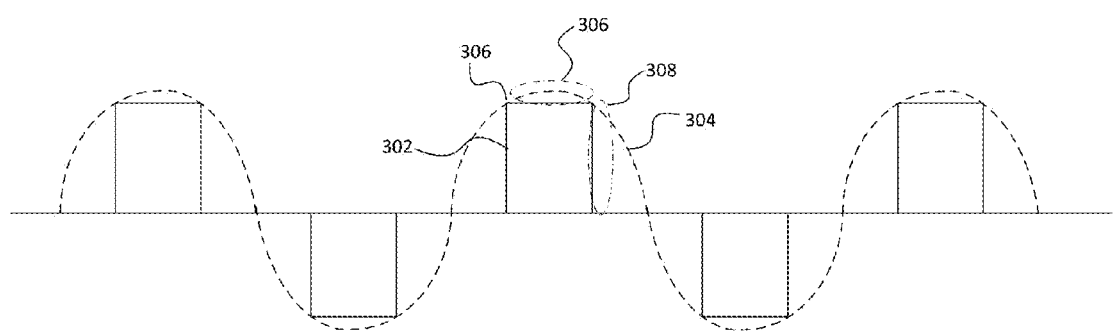
FIG. 3 depicts illustrative waveforms.

The operation of the lighting circuit 200 according to an embodiment will now be described with additional reference to FIG. 2 and FIG. 3. In FIG. 3, a square waveform 302 represents the current drawn by the LED lights 208 (current versus time), while a sinusoidal waveform 304 represents the input voltage experienced at the LED lights 208 (voltage versus time). It is to be understood that the operations described may happen in every cycle of the two waveforms even though only one half cycle is labeled in FIG. 3.

(1) The logic circuitry 202 controls the driver 206 to generate a signal having the voltage waveform 304. (2) When the voltage ($V_{IN-LED}$) input at the LED lights 208 equals the forward voltage ($V_{FWD-LED}$) of the LED lights 208 (location 306 of FIG. 3), current passes through the LED lights 208, and the LED lights 208 turn on. (3) When $V_{IN-LED}$ exceeds $V_{FW-LED}$ (region 306 in FIG. 3), the resulting voltage change is reflected as a voltage change at the positive input of the amplifier 222. The amplifier 222 will attempt to drive transistor 216 such that the voltage produced across sense resistor 220 will match the voltage supplied by first and second divider resistors 224 and 226, resulting in a sinusoidal current waveform. (4) When $V_{IN-LED}$ drops back below $V_{FWD-LED}$ (region 308 in FIG. 3), the LED lights 208 turn off.

Figure 4A:
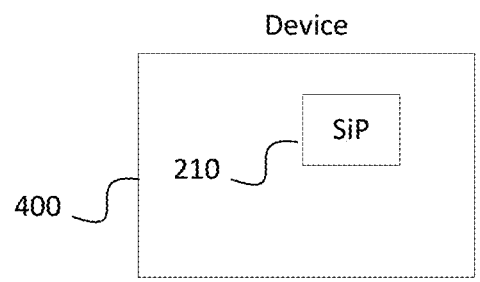
FIG. 4A is a block diagram depicting a discrete hardware device (e.g., system in package ("SiP")) that includes a circuit such as that depicted in FIG. 2.
Figure 4B:
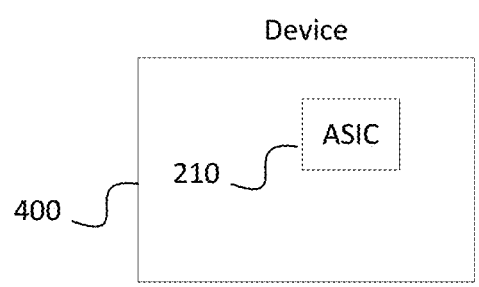
FIG. 4B is a block diagram depicting another type of discrete hardware device (an application specific integrated circuit ("ASIC")) that includes a circuit such as that depicted in FIG. 2.

The power harmonics correction circuit 210 may be also implemented as a separate module (such as a SiP) or an ASIC for use in a larger device 400, as shown in FIG. 4A and FIG. 4B. The circuit 210 may also be incorporated within a discrete hardware module (SiP, ASIC, daughter board, etc.) may contain all of the functionality of the circuit 210 but allow external FET's to be used in addition if power requirements are higher than the module can handle. The module may be programmable.

Figure 5:
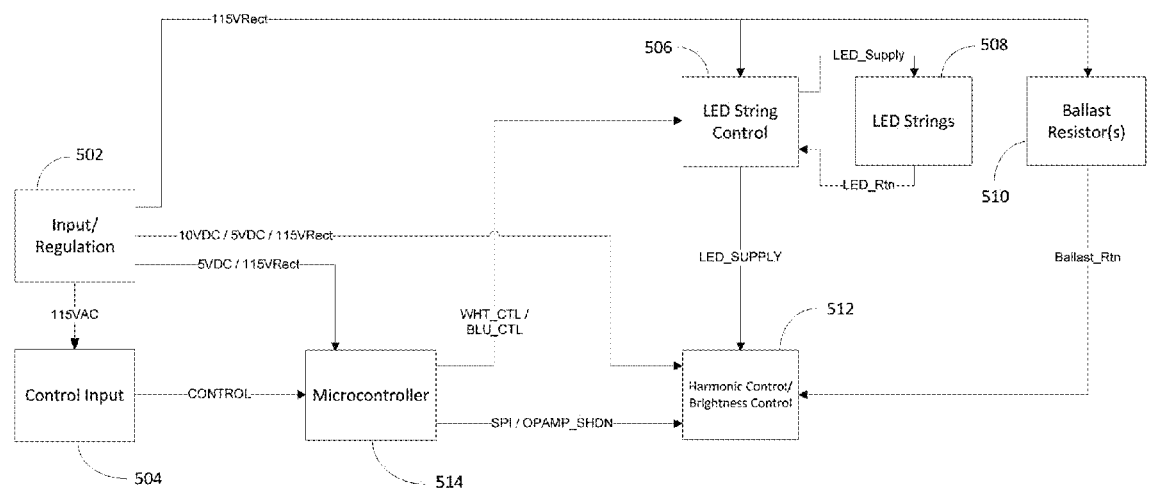
FIG. 5 is a block diagram of a system configured according to an embodiment.

Turning to FIG. 5, a block diagram depicts a lighting device 500 that is configured according to an embodiment. The lighting device 500 includes input/regulation circuitry 502, control input circuitry 504, LED string control circuitry 506, LED strings 508, one or more ballast resistors 510, harmonic control/brightness control circuitry 512, and a microcontroller 514.

Figure 6:
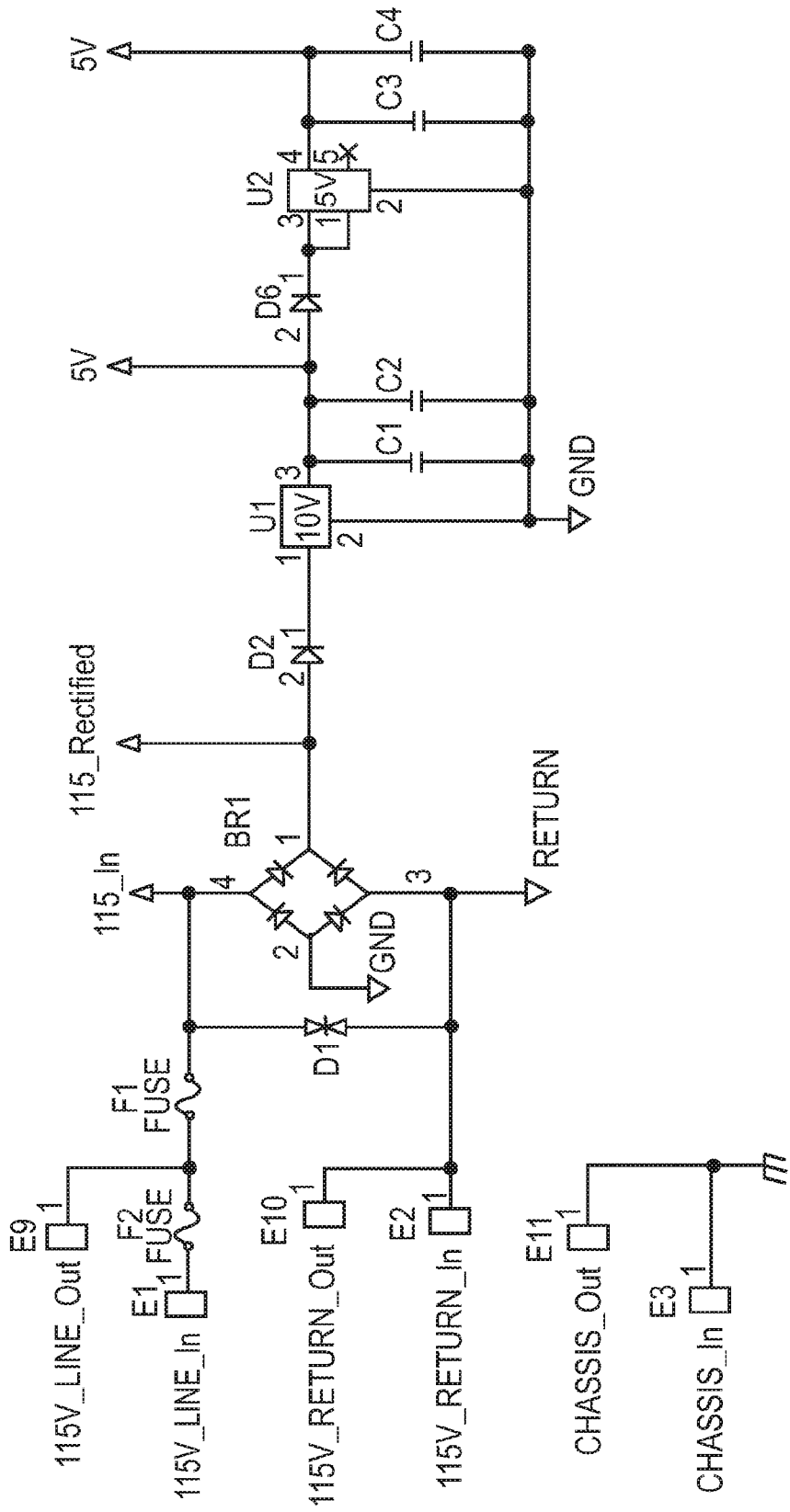
FIG. 6 is a circuit diagram of the "Input/Regulation" block of FIG. 5 configured according to an embodiment.

In an embodiment, the input/regulation circuitry 502 is configured as shown in FIG. 6. According to an embodiment, (1) integrated circuit ("IC") U1 is a linear regulator rated to 450Vin, (2) IC U2 is a low dropout ("LDO") voltage regulator, and (3) diodes protect against reverse discharge and hold up μC supply during power interrupts.

Figure 7:
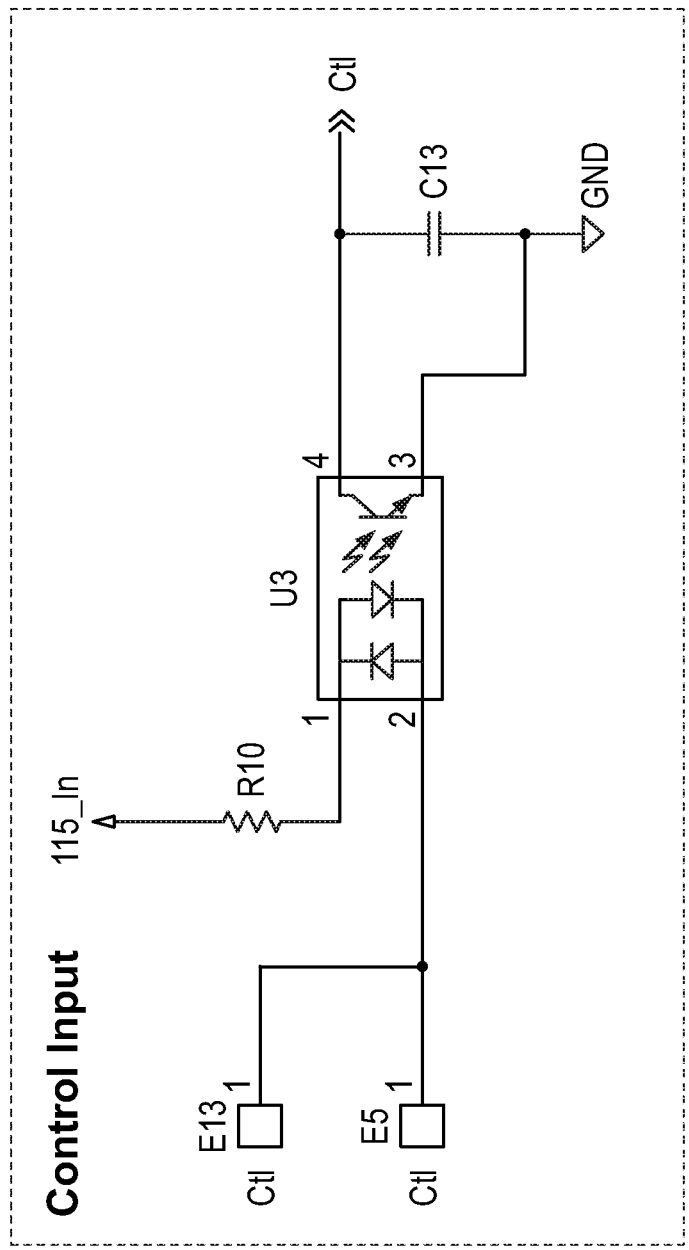
FIG. 7 is a circuit diagram of the "Control Input" block of FIG. 5 configured according to an embodiment.

In an embodiment, the control input circuitry 504 is configured as shown in FIG. 7. The control input circuitry 504 functions as an "active low" input control block.

Figure 8:
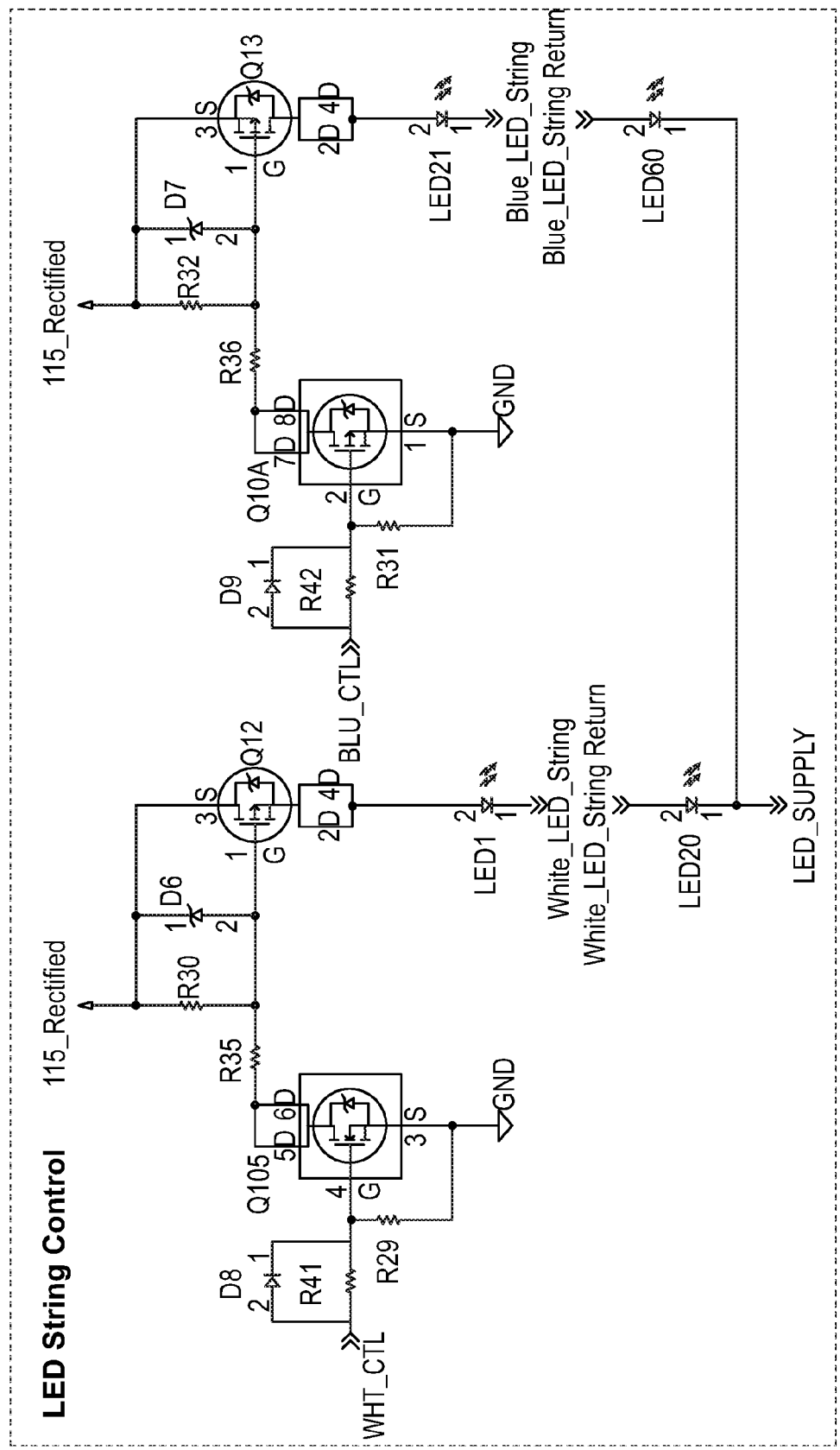
FIG. 8 is a circuit diagram of the "LED String Control" block of FIG. 5 configured according to an embodiment.

In an embodiment, the LED string control circuitry 506 is configured as shown in FIG. 8. According to an embodiment, the LED string control circuitry 506 includes two LED drive circuits. Furthermore, in an embodiment: (1) Q12 and Q13 are 400V rated P-channel MOSFETs, (2) source-to-gate Zener diodes D5 and D7 prevents electrical overstress ("EOS") at their respective gates, (3) Q10A and Q10B are 400V rated N-channel MOSFETs that default to an off states, and (4) LED Gnd is supplied by the harmonic control/brightness control circuitry 512.

Figure 9A:
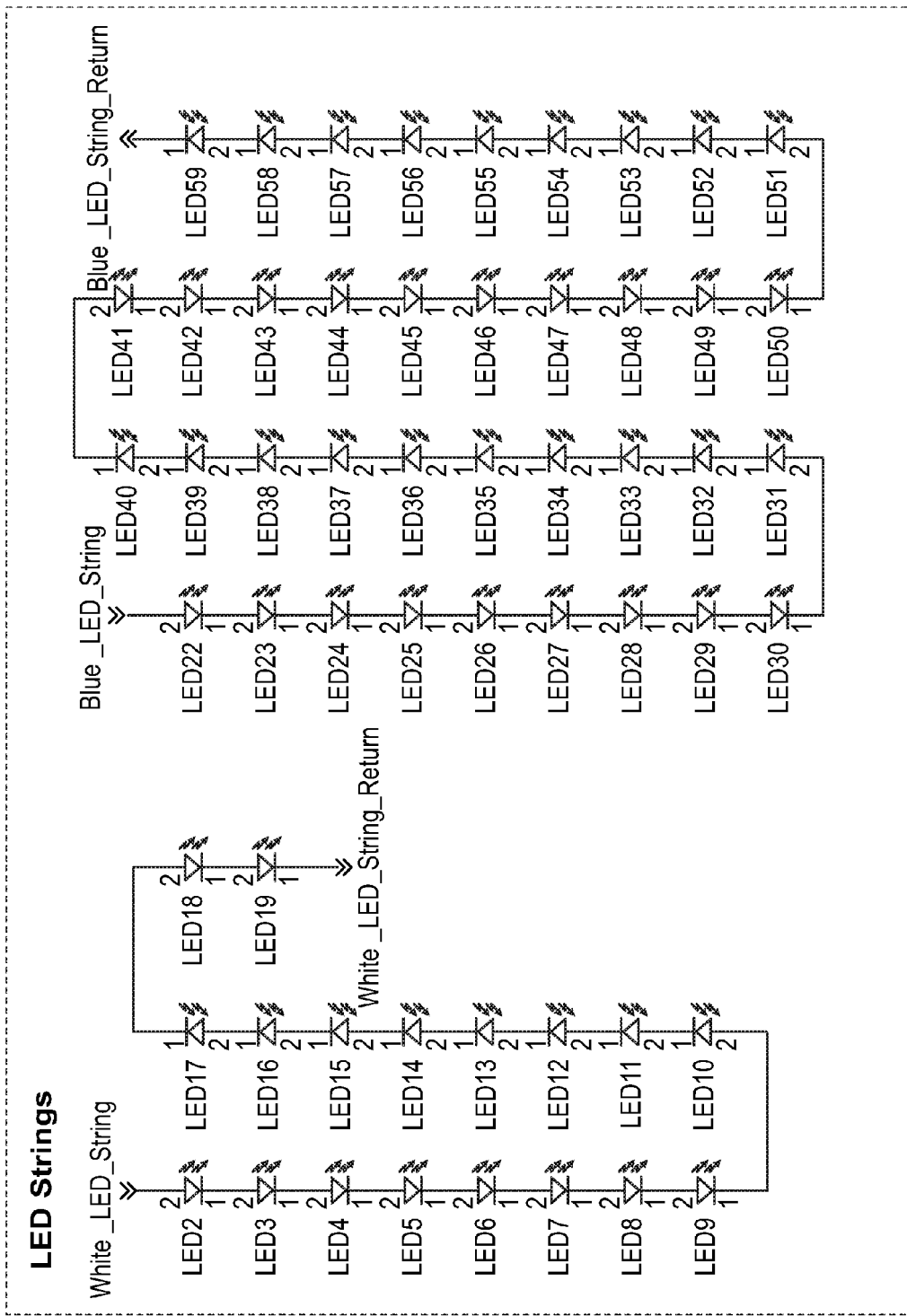
FIG. 9A and FIG. 9B are circuit diagrams of the "LED Strings" block of FIG. 5 configured according to different embodiments.
Figure 9B:
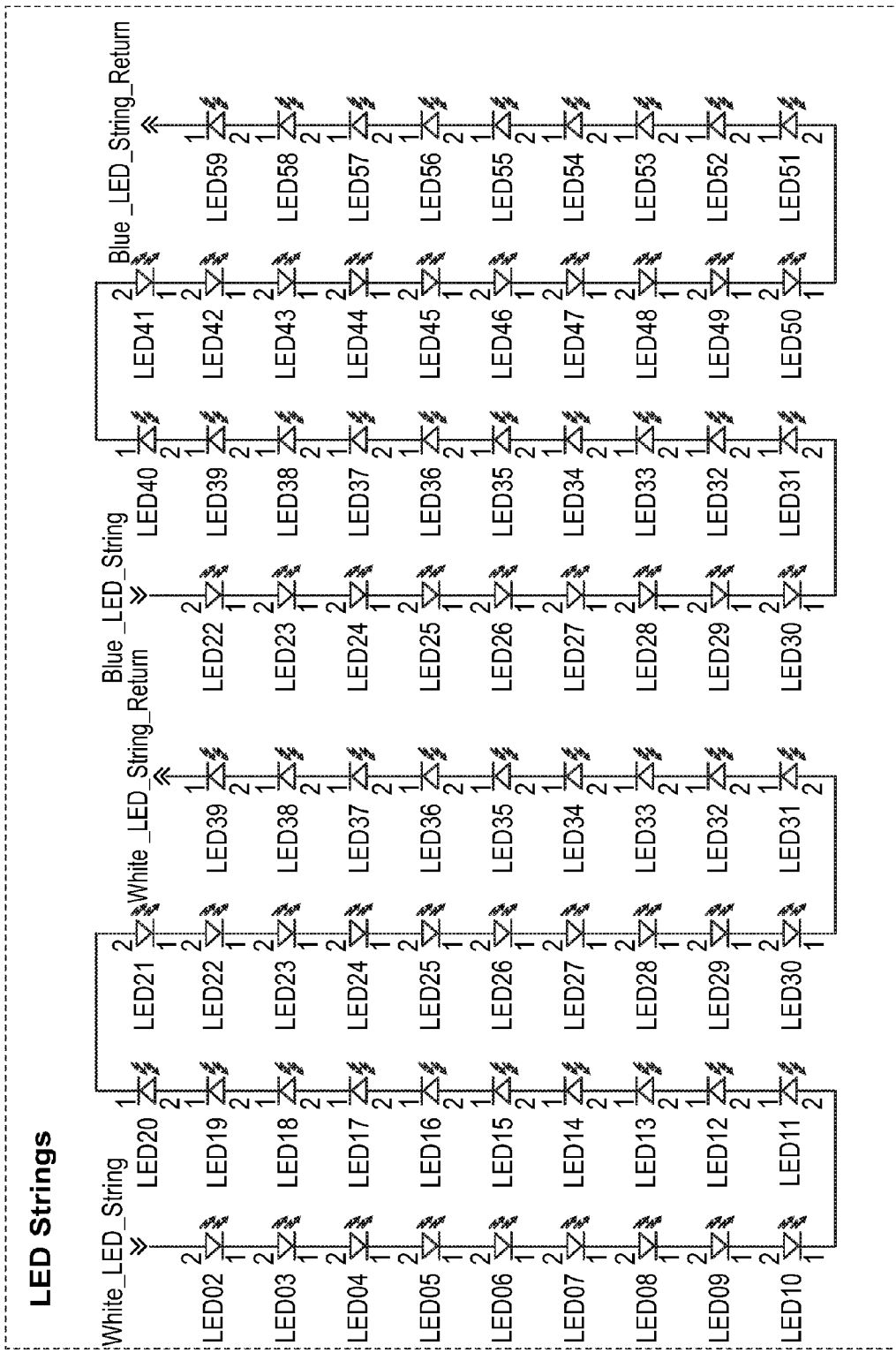

According to an embodiment, the LED strings 508 include a white LED string (having all white LED lights) and a blue LED string (having alternating blue and white LED lights), as shown in FIGS. 9A and 9B.

Figure 10:
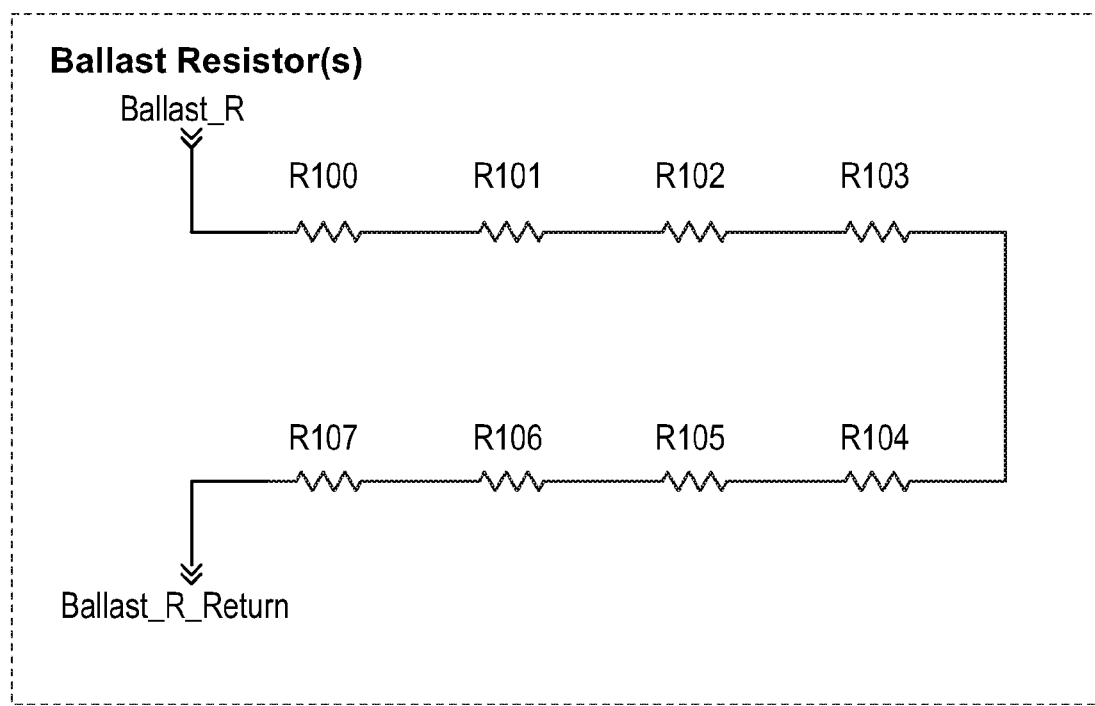
FIG. 10 is a circuit diagram of the "Ballast Resistor(s)" block of FIG. 5 configured according to an embodiment.

In an embodiment, the one or more ballast resistors 510 are configured as shown in FIG. 10, in which the resistors R100-R107 are 0.5 Watt resistors. The ballast resistors dissipate power when the LEDs are not conducting. The resistance of the one or more ballast resistors 510 may be optimized for 97 volts input.

Figure 11:
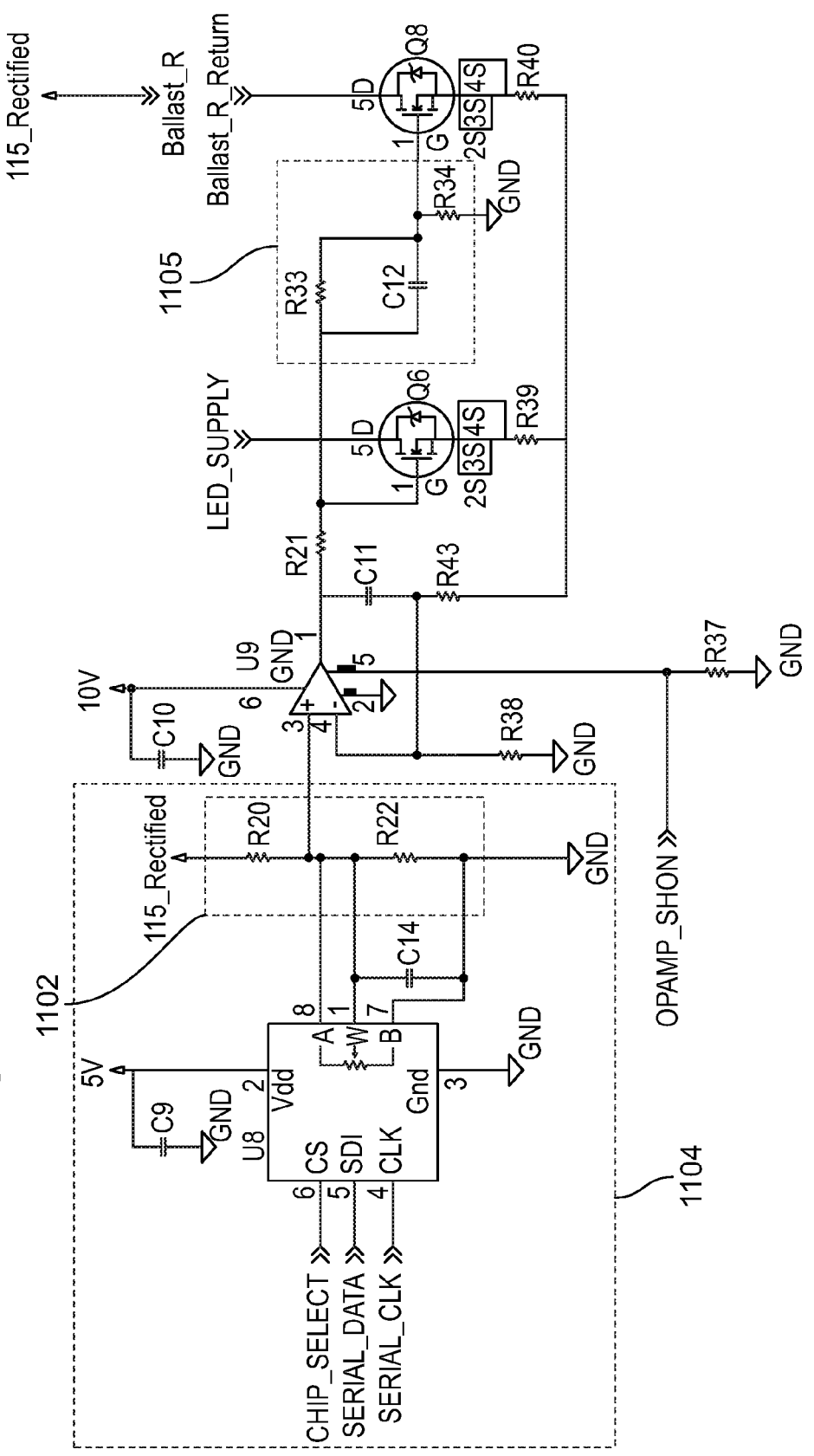
FIG. 11 is a circuit diagram of the "Harmonic Control/Brightness Control" block of FIG. 5 configured according to an embodiment.

In an embodiment, the harmonic control/brightness control circuitry 512 is configured as shown in FIG. 11. In this embodiment, the microcontroller 514 controls a digital potentiometer U8, which sets the divider ratio for a voltage divider 1102 (which includes resistors R20 and R22 plus the contribution of the potentiometer U8. The differential circuit in this embodiment is an op-amp U9, which operates in a way that keeps the first and second inputs (labeled 3 and 4) equal. Thus, if the feedback current at the second input is equal to the current at the first input, the op-amp U9 will maintain its current state.

Referring still to FIG. 11, the brightness control circuitry portion 1104 of the harmonic control/brightness control circuitry 512 achieves brightness control by adjusting the digital potentiometer U8, which changes the scale of the reference AC waveform. There are many possible implementations of the digital potentiometer U8, including an 8-bit 10K potentiometer for 256 steps. During operation the MOSFET Q6, which functions as the LED driver, is turned on first (i.e., by output from the op-amp U9) in order to supply current to the LED strings 508 (via LED SUPPLY). If the LED lights of the LED strings 508 will not turn on (a fact that will be sensed by the sense resistor R38, the op-amp U9 will keep ramping its output voltage up until the other MOSFET Q8 turns on. When the MOSFET Q8 turns on (i.e., allows current to flow between the source and drain) then the ballast resistor(s) 510 will receive and dissipate the input power. A voltage divider 1105 (which includes resistors R33 and R34, and capacitor C12) makes the MOSFET Q6 the dominant MOSFET. Q6 will turn on first because it gets a higher voltage (based on the voltage divider 1105 reducing the input voltage at the gate of Q8). In short, the op-amp U9 it will try to turn the LEDs on, and only when the op-amp U9 is unable to turn the LEDs on will it "turn on" the ballast.

Turning to FIGS. 12A-12I, waveforms illustrating the effect on the LED strings of operating the harmonic control circuitry taken on 115AC input are shown. From these waveforms, it can be seen that: (1) The waveform for Vin of device (e.g., LRU lighting unit) operating according to an embodiment is the also the desired shape of the current waveform, (2) a scaled version of Vin (peak<5V) appears on the op-amp non-inverting input, (3) scaling is controlled by the digital potentiometer, (4) circuit feedback is provided from the sense resistor to the inverting op-amp input, and (5) the op-amp drives the MOSFETs in an attempt to make the current waveform similar to the voltage waveform.

Figure 12A:
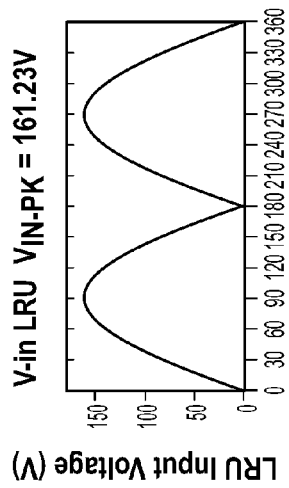
FIG. 12A depicts a waveform of the input voltage of a line replaceable unit ("LRU") according to an embodiment.
Figure 12B:
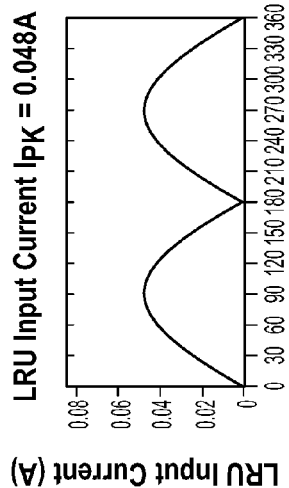
FIG. 12B depicts a waveform of the input current of an LRU according to an embodiment.
Figure 12C:
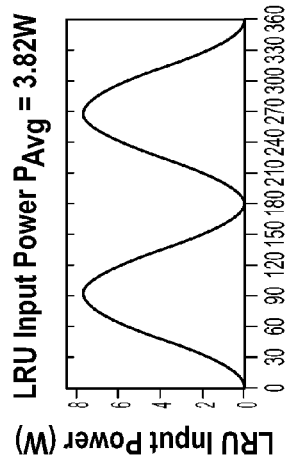
FIG. 12C depicts a waveform of the input power of an LRU according to an embodiment.
Figure 12D:
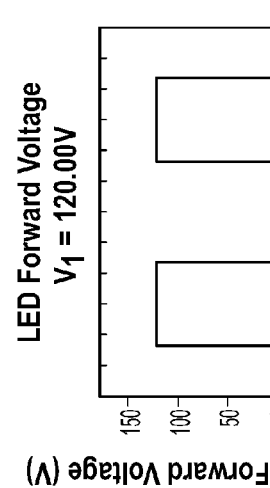
FIG. 12D depicts a waveform of the forward voltage across a light emitting diode ("LED") string according to an embodiment.
Figure 12E:
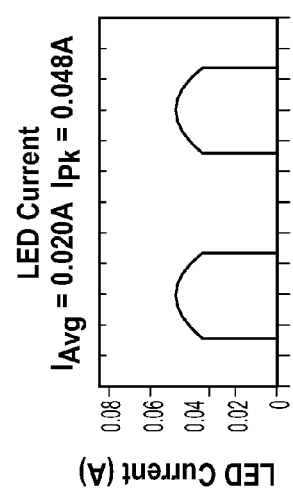
FIG. 12E depicts a waveform of the current through an LED light string according to an embodiment.
Figure 12F:
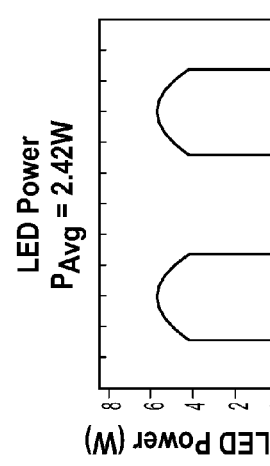
FIG. 12F depicts a waveform of the power dissipated in an LED light string according to an embodiment.
Figure 12G:
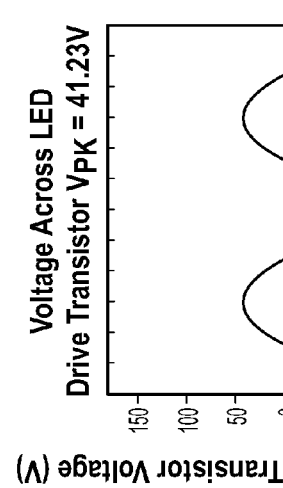
FIG. 12G depicts a waveform of the voltage across an LED drive transistor according to an embodiment.
Figure 12H:
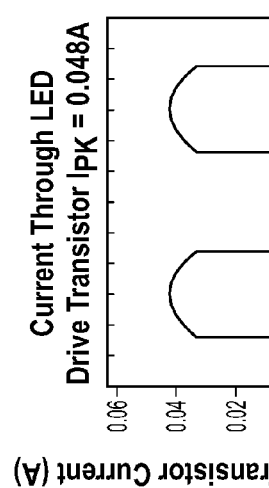
FIG. 12H depicts a waveform of the current through an LED drive transistor according to an embodiment.
Figure 12I:
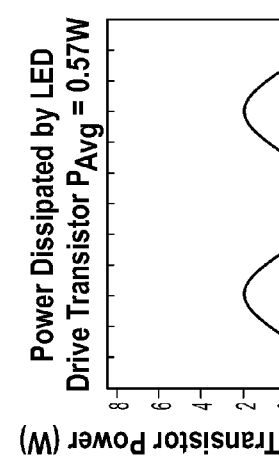
FIG. 12I depicts a waveform of the power dissipated in an LED drive transistor according to an embodiment.

It is to be noted that (1) FIG. 12G shows how the voltage above the forward voltage of the LED lighting units is dissipated as heat on the Q5 MOSFET. (2) FIG. 12E shows the LED conduction, where Vin is greater than 120V, and (3) FIG. 12I shows the average power of Q5.

Turning to FIGS. 13A-13G, waveforms illustrating the operation the harmonic control circuitry from the perspective of the one or more ballast resistors when the entire circuit is receiving 115 VAC in. According to an embodiment: (1) Ideal ballast behavior is that the ballast resistor is to be selected so that at the voltage that LEDs begin conducting, the ballast resistor is passing the same current the LEDs will, (2) The ballast resistor's current is proportional to the voltage across it, so it produces low total harmonic distortion THD. (3) Ballast resistor is selected to optimize its current at the minimum input voltage. (4) At higher input voltages, the harmonic correction transistor regulates the current through the ballast resistor by developing the appropriate voltage across itself.

Figure 14:
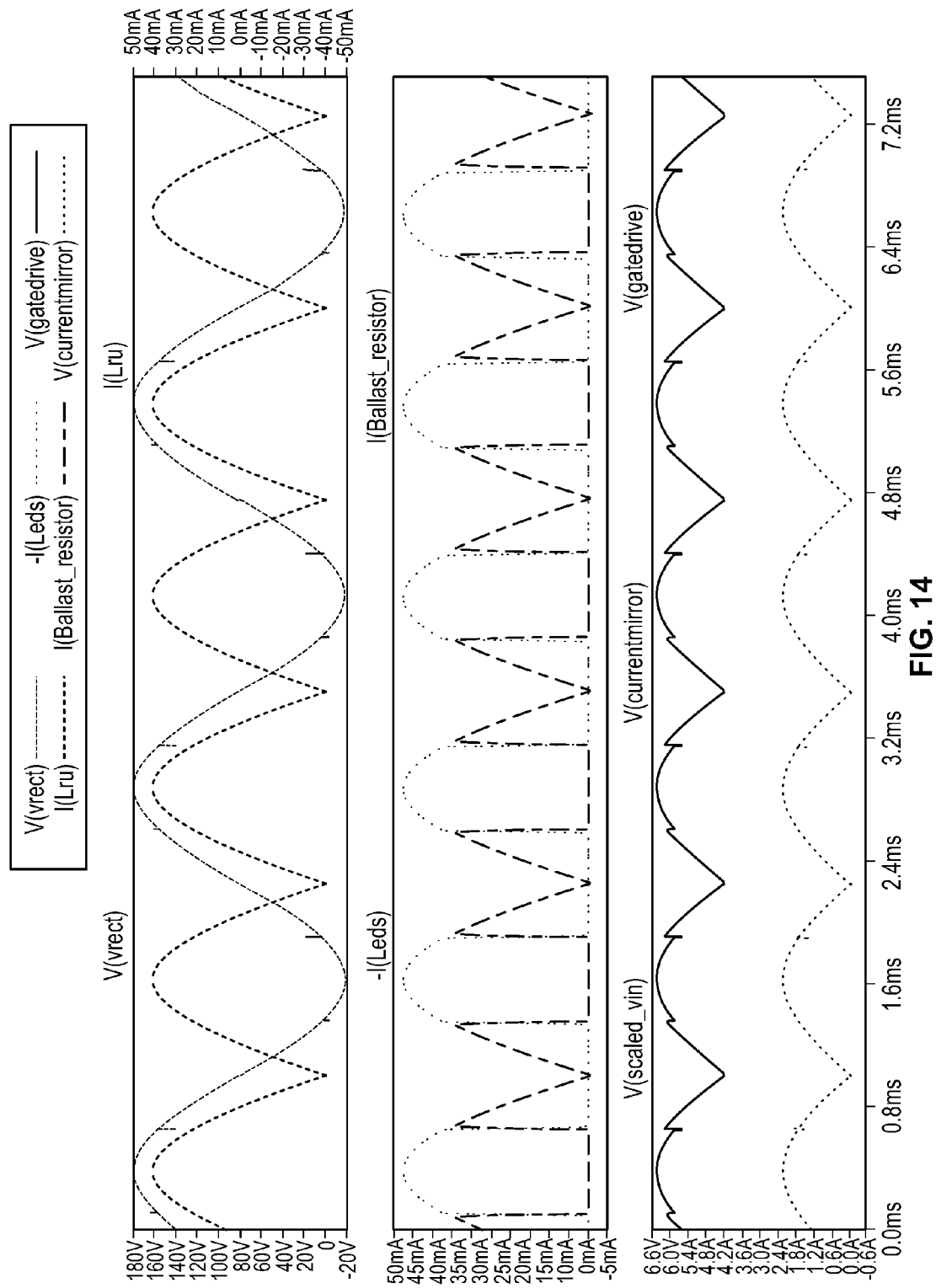
FIG. 14 depicts a simulation showing how techniques described herein result in significantly reduced harmonics.

Turning to FIG. 14, according to an embodiment, a SPICE simulation depicts the LED current (middle row) and ballast current (bottom row) and the total current (top row). Although the total current shows a couple spikes (crossover spikes), the total current is relatively smooth and, like the signal on the sense resistor, sinusoidal.

Figure 15:
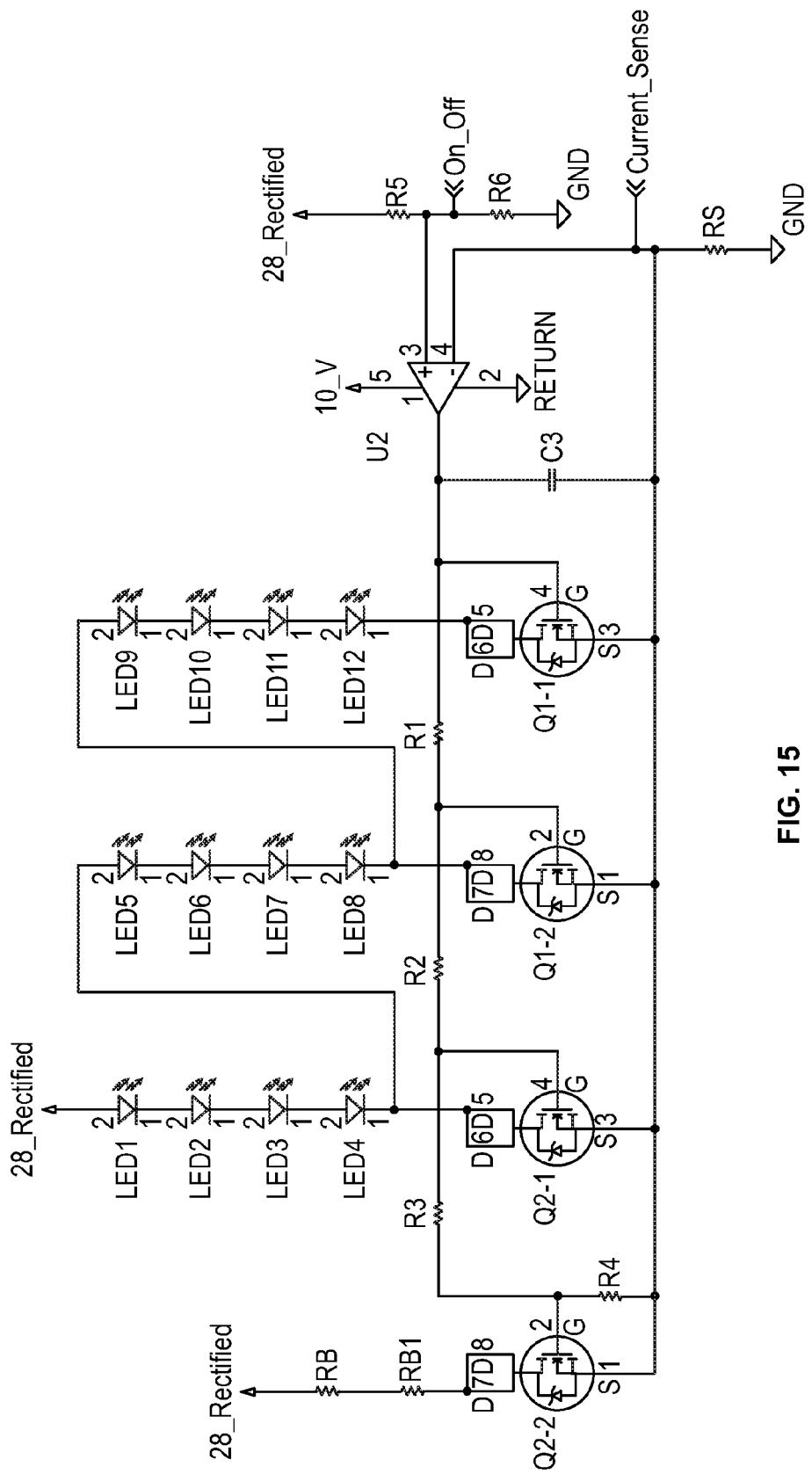
FIG. 15 depicts an embodiment in which the LED lights are configured into banks and cascading lighting control is employed.

According to an embodiment, the LED strings 508 are configured as multiple banks and are driven by cascading MOSFETs, as shown in FIG. 15. This configuration allows for an additional method of decreasing the overall brightness of the LED lights. Instead of routing the current directly to the ballast resistors, the circuit of FIG. 15 operates as follows. Because of the voltage dividers (resistors R1, R2, and R3 in this case), the gate of MOSFET Q1-1 will received the highest voltage from the op-amp U2, the gate of MOSFET Q1-2 will receive the next highest, Q2-1 the next highest, and Q2-2 the least high. Thus, when the voltage across the entire string of LED lights (LED1 through LED12) drops below the required forward voltage to activate the string, the op-amp U2 increases its output until the voltage at the gate of Q1-2 is high enough to permit current to pass between source and drain, which then permits a second bank (LED5, LED6, LED7, and LED8) and a third bank (LED1, LED2, LED3, and LED4) to continue operating even though the first bank (LED9, LED10, LED11, and LED12) of LED lights is no longer on. If the voltage across the second and third banks drops below the required forward voltage, the op-amp U2 again raises its output voltage until the voltage at the gate of Q2-1 is sufficient to pass current through Q2-1, which keeps the first bank of LED lights lit. This process continues until the LED lights are all turned off and the current is all routed through the ballast resistors RB and RB1.

The resulting power factor in a circuit implemented according to the present disclosure may be 1.00 with a total harmonic distortion of less than 1 percent, which compares favorably to a power factor of 0.95 to 0.99 and a total harmonic distortion of (at best) 3% in current commercial designs. Furthermore, since a circuit according to the present disclosure adapts to what the voltage is (and is not dependent on the input waveform or frequency), it can function in, for example, at 50-1000 Hertz. Furthermore, a triangle versus sinusoidal waveform is satisfactory.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A power harmonics correction hardware unit comprising
   a first node;
   a second node;
   a first current path extending from the first node to the second node, wherein the first current path is electrically connected to a load that is external to the power harmonics correction hardware unit;
   a second current extending from the first node to ground;
   a third current path extending from the first node to the second node;
   a sense resistor electrically connected to the second node and to ground, wherein the voltage across the sense resistor has a waveform whose shape and phase represent the shape and phase of the waveform of a current on the first current path;
   a differential circuit comprising a first input, a second input, and an output, wherein the first input is electrically connected to the second current path and the second input is electrically connected to the sense resistor; and
   a transistor comprising a gate that is electrically connected to the output of the differential circuit, a drain that is electrically connected to the third current path, and a source that is electrically connected along the third current path so that transistor provides feedback to the second input of the differential circuit;
   wherein, during operation of the power harmonics correction hardware unit,
      when the current waveform changes, the change is reflected as a voltage change at the first input of the differential circuit;
      the differential circuit drives the transistor so as to equalize the voltage at the first and second inputs, resulting in a current waveform whose phase and shape are matched to that of the voltage waveform.

2. The power harmonics correction hardware unit of claim 1, further comprising a ballast resistor electrically connected to the first node and to the drain of the transistor, wherein the source of the transistor is electrically connected to the second node.

3. The power harmonics correction hardware unit of claim 1, further comprising a first divider resistor electrically connected along the second current path and a second divider resistor electrically connected along the second current path, a third node being defined between the first and second resistors, wherein the first input of the differential circuit is electrically connected to the third node.

4. The power harmonics correction hardware unit of claim 1, further comprising logic circuitry that controls the driver to generate the signal.

5. The power harmonics correction hardware unit of claim 1, wherein the waveform on the first current path is a square waveform and the waveform of the sense resistor is a sinusoidal waveform whose shape and phase matches that of a sinusoidal waveform defined such that the square waveform fits within and extends to the lateral boundaries of the current waveform.

6. A lighting unit having incorporated therein the power harmonics correction hardware unit of claim 1.

7. The power harmonics correction hardware unit of claim 1, implemented as a system in a package.

8. The power harmonics correction hardware unit of claim 1, implemented as an application specific integrated circuit.

9. A power harmonics correction circuit comprising
   a first node;
   a second node;
   a first current path extending from the first node to the second node;
   a second current extending from the first node to ground;
   a third current path extending from the first node to the second node;
   a sense resistor electrically connected to the second node and to ground, wherein the voltage across the sense resistor has a waveform whose shape and phase represent the shape and phase of the waveform of a current on the first current path;

a differential circuit comprising a first input, a second input, and an output, wherein the first input is electrically connected to the second current path and the second input is electrically connected to the sense resistor;

a potentiometer electrically connected to the first input of the differential circuit;

logic circuitry that controls the resistance of the potentiometer; and a transistor comprising:
   a gate that is electrically connected to the output of the differential circuit, and
   a drain that is electrically connected to the third current path, and a source that is electrically connected along the third current path so that transistor provides feedback to the second input of the differential circuit, wherein, during operation of the power harmonics correction circuit, when the current waveform changes, the change is reflected as a voltage change at the first input of the differential circuit;

wherein the voltage at the first input of the differential circuit scales up or down based on the change in the resistance of the potentiometer;

the differential circuit drives the transistor so as to equalize the voltage at the first and second inputs, resulting in a current waveform whose phase and shape are matched to that of the voltage waveform.

10. A light-emitting diode (LED) lighting unit comprising the power harmonics correction circuit of claim 9 and further comprising:

a plurality of LED lights;

a second transistor whose source and drain are electrically connected in series with the plurality of LED lights and with the second node, and whose gate is electrically connected to the output of the differential circuit, such that as the voltage at the first input of the differential circuit scales up or down based on the change in the resistance of the potentiometer, the differential circuit drives the second transistor so as to control the brightness of the plurality of LED lights.

11. The power harmonics circuit of claim 9, further comprising a voltage divider electrically connected to the first input of the differential circuit, wherein the potentiometer contributes resistance to the voltage divider.

* * * * *